United States Patent [19]

Yamaguchi et al.

[11] Patent Number: 5,216,457
[45] Date of Patent: Jun. 1, 1993

[54] REAL IMAGE TYPE ZOOM FINDER

[75] Inventors: Takao Yamaguchi, Yokohama; Nobuaki Ono, Tokyo, both of Japan

[73] Assignee: Ricoh Company, Ltd., Tokyo, Japan

[21] Appl. No.: 753,440

[22] Filed: Aug. 30, 1991

[30] Foreign Application Priority Data

Aug. 31, 1990 [JP] Japan .................................. 2-231287
Sep. 4, 1990 [JP] Japan .................................. 2-233865
Jun. 20, 1991 [JP] Japan .................................. 3-148869

[51] Int. Cl.⁵ .............................................. G03B 13/14
[52] U.S. Cl. ...................................... 354/221; 354/222
[58] Field of Search ............... 354/219, 221, 222, 224, 354/225, 199, 201

[56] References Cited

U.S. PATENT DOCUMENTS

4,992,809  2/1991  Nozaki et al. ......................... 354/222
5,117,247  5/1992  Nakai et al. ............................ 354/222

*Primary Examiner*—David M. Gray
*Attorney, Agent, or Firm*—Fish & Richardson

[57] ABSTRACT

A real image type zoom finder has a Porro prism for an erecting image arranged between an objective lens system and an eyepiece system, and a reflecting mirror or a movable prism constituting a portion of the Porro prism. The reflecting mirror or the movable prism is moved in a direction of an optical axis of the lens systems in accordance with distance information about a photographed object from a focal length detector, and/or information about the focal length of a zoom lens from a zoom focal length detector, thereby correcting parallax. The reflecting mirror may be composed of two overlapped mirrors constructed by a first mirror as a semi-transparent mirror arranged on the side of an objective lens and a second mirror composed of a total reflection mirror. In this case, the second mirror can be moved in the direction of the optical axis of the lens systems by a moving amount according to information about the focal length of the zoom lens.

4 Claims, 8 Drawing Sheets

A FRAME FOR VISUAL FIELD  B  6

Fig. 8b

PHOTOGRAPHING SCREEN

Fig. 8c

OBJECTIVE LENS OF FINDER

PHOTOGRAPHED OBJECT AT CLOSE DISTANCE

IMAGE POSITION OF PHOTOGRAPHED OBJECT AT CLOSE DISTANCE

IMAGE POSITION OF PHOTOGRAPHED OBJECT AT FAR DISTANCE

REAL IMAGE TYPE ZOOM FINDER

BACKGROUND OF THE INVENTION

1. Field of the Invention

The present invention relates to a real image type zoom finder having a function for correcting parallax of a finder.

2. Description of the Related Art

In a general known real image type zoom finder, a Porro prism for an erecting image is arranged between an objective lens system and an eyepiece system. This real image type zoom finder is used as a finder of a lens shutter camera, etc.

In the lens shutter camera having the above real image type zoom finder, the optical axis of a photographing lens system is different from that of a finder system. Such a lens shutter camera has no problem about a photographed object located at infinity. However, such a lens shutter camera has a problem that a photographing center is shifted from the center of a visual field of the finder in the case of the photographed object located at a close distance since the optical axis of the photographing lens system is different from the optical axis of the finder system. Such a shift is called parallax.

In particular, in the lens shutter camera using a zoom lens in the photographing lens system, this parallax is severely caused on a long focal length side of this camera.

The long focal length side is a focal length on a tele-side of the zoom lens and the short focal length side is a focal length on a wide-side of the zoom lens.

Further, parallax amounts at short and long focal lengths are different from each other on a film surface. Accordingly, it is insufficient to correct parallax by using a parallax correcting method applied to a camera using a photographing lens having a single focal length.

For example, Japanese Patent Application Laying Open (KOKAI) No. 63-179340 discloses a real image type finder having a function for correcting parallax. In this real image type finder a portion of a Porro prism is constructed by a reflecting mirror and this reflecting mirror is rotated in accordance with distance information about an object so as to correct parallax. In such a method for rotating the reflecting mirror, no optical axis of the finder is perpendicular to an image plane by the rotation of the reflecting mirror, thereby reducing an image performance.

In the lens shutter camera using a zoom lens in the photographing lens system, a parallax amount on a short focal length side is different from that on a long focal length side.

When an object is photographed, it is possible to correct parallax and visualize a photographing range by moving a frame for a visual field, etc. in conformity with a distance between the photographed object and a camera after this distance is detected. However, when no distance between the photographed object and the camera is detected, it is impossible to correct parallax and confirm the range of a photographing area by a finder.

It is possible to display a mark for confirming the photographing area at a close distance in advance within the visual field. However, in the lens shutter camera using a zoom lens in the photographing lens system, the parallax amounts on the short and long focal length sides are different from each other in accordance with the focal length of the zoom lens as mentioned above. Accordingly, display positions of the mark are different from each other so that it is complicated to display the mark within the visual field.

SUMMARY OF THE INVENTION

It is therefore a first object of the present invention to provide a real image type zoom finder having a function for correcting parallax without reducing an image performance.

A second object of the present invention is to provide a real image type zoom finder having a function for correcting parallax and adjusting a correction amount of parallax to a suitable amount in accordance with a parallax amount.

A third object of the present invention is to provide a real image type zoom finder in which a photographing area at a proximate distance can be confirmed within a finder before a distance measurement, thereby improving an accuracy in framing.

The above first and second objects of the present invention can be achieved by a real image type zoom finder comprising prism means for an erecting image arranged between an objective lens system and an eyepiece system; and light reflecting means constituting a portion of the prism means and moved in a direction of an optical axis of the lens systems in accordance with at least distance information about a photographed object.

Concretely, a first structure of the present invention resides in a real image type zoom finder comprising prism means for an erecting image arranged between an objective lens system and an eyepiece system; and a reflecting mirror constituting a portion of the prism means and moved in a direction of an optical axis of the lens systems in accordance with distance information about a photographed object.

A second structure of the present invention resides in a real image type zoom finder comprising prism means for an erecting image arranged between an objective lens system and an eyepiece system; and a reflecting mirror constituting a portion of the prism means and moved in a direction of an optical axis of the lens systems in accordance with distance information about a photographed object and information about the focal length of a zoom lens.

A third structure of the present invention resides in a real image type zoom finder comprising prism means for an erecting image arranged between an objective lens system and an eyepiece system; and a movable prism constituting a portion of the prism means and moved in a direction of an optical axis of the lens systems in accordance with distance information about a photographed object.

A fourth structure of the present invention resides in a real image type zoom finder comprising prism means for an erecting image arranged between an objective lens system and an eyepiece system; and a movable prism constituting a portion of the prism means and moved in a direction of an optical axis of the lens systems in accordance with distance information about a photographed object and information about the focal length of a zoom lens.

In the first structure of the present invention, the reflecting mirror constituting a portion of the prism means is moved in the direction of the above optical axis in accordance with the distance between a camera and the photographed object. Accordingly, it is possible to correct parallax in a state in which this optical axis is perpendicular to an image face.

In the second structure of the present invention, the reflecting mirror constituting a portion of the prism means is moved in the direction of the above optical axis in accordance with the distance between a camera and the photographed object and the focal length of the zoom lens. Accordingly, it is possible to adjust a correction amount of parallax to a suitable amount in accordance with a change in parallax amount caused by a change in focal length.

In the third structure of the present invention, the movable prism constituting a portion of the prism means is moved in the direction of the above optical axis in accordance with the distance between a camera and the photographed object. Accordingly, it is possible to correct parallax in a state in which this optical axis is perpendicular to an image face.

In the fourth structure of the present invention, the movable prism constituting a portion of the prism means is moved in the direction of the above optical axis in accordance with the distance between a camera and the photographed object and the focal length of the zoom lens. Accordingly, it is possible to adjust a correction amount of parallax to a suitable amount in accordance with a change in parallax amount caused by a change in focal length.

The above third object of the present invention can be achieved by a real image type zoom finder comprising prism means for an erecting image arranged between an objective lens system and an eyepiece system; and a reflecting mirror constituting a portion of the prism means and composed of two overlapped mirrors; the two overlapped mirrors of the reflecting mirror being constructed by a first mirror as a semi-transparent mirror arranged on the side of an objective lens and a second mirror composed of a total reflection mirror; and the second mirror being able to move in a direction of an optical axis of the lens systems by a moving amount according to information about the focal length of a zoom lens.

In this structure of the present invention, the second mirror of the reflecting mirror constituting a portion of the prism means is moved in the direction of an optical axis of the lens systems by a moving amount according to information about the focal length of a zoom lens. Accordingly, it is possible to form two overlapped images by the first and second mirrors within the visual field of a finder. The image formed by the second mirror can be set to an image shifted by a parallax amount according to the focal length of the zoom lens when an object is photographed at a close distance. Accordingly, it is possible to easily visualize the parallax amount according to the focal length of the zoom lens from a shift in image area between the first and second mirrors.

Further objects and advantages of the present invention will be apparent from the following description of the preferred embodiments of the present invention as illustrated in the accompanying drawings.

BRIEF DESCRIPTION OF THE DRAWINGS

FIG. 12b is a view for explaining an operation and effects of the real image type zoom finder shown in FIGS. 9 and 10 and shows an operating state of the real image type zoom finder in which the para-visual mode switch is turned on.

DESCRIPTION OF THE PREFERRED EMBODIMENTS

The preferred embodiments of a real image type zoom finder in the present invention will next be described in detail with reference to the accompanying drawings.

Figure 1:
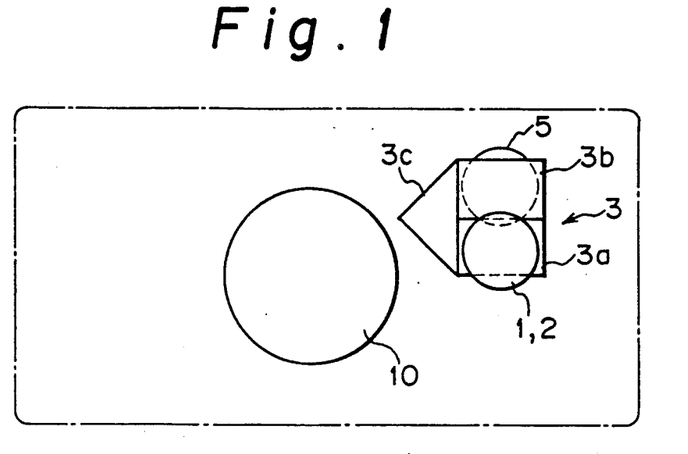
FIG. 1 is a front view of a general lens shutter camera showing an arrangement example thereof in which a photographing lens system and a real image type zoom finder system are seen from a front side of the camera.
Figure 2:
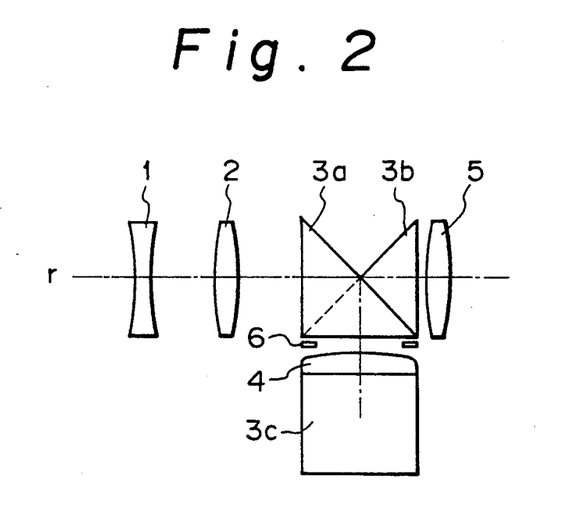
FIG. 2 is a view for explaining an optical system of a general real image type finder.

FIG. 1 is a front view of a lens shutter camera in an arrangement example thereof which a photographing lens system 10 and a real image type zoom finder system 10 are seen from a front side of the camera. FIG. 2 is a view for explaining an optical system of the real image type zoom finder system. This real image type zoom finder system has a first lens group 1 and a second lens group 2 constituting an objective lens system, and three prisms 3a, 3b, 3c constituting a Porro prism section 3. The real image type zoom finder system further has a condenser lens 4, an eyepiece system 5 and a frame 6 for a visual field. A photographed object is focused and formed as an image by the first and second lens groups 1 and 2 in a position of the frame 6 for a visual field. The formed image is enlarged by the eyepiece system 5 to see an enlarged image.

The first and second lens groups 1 and 2 of the objective lens system are moved in a direction of an optical axis thereof in accordance with zooming of a photographing lens system 10, thereby changing a focal length of the objective lens system. The Porro prism section 3 is an image-inverting section for changing an inverted image formed by the lens system to an erecting image.

In the lens shutter camera having the above real image type zoom finder, an optical axis of the photographing lens system 10 is different from that of the finder system. Such a lens shutter camera has no problem about a photographed object located at infinity. However, such a lens shutter camera has a problem that a photographing center is shifted from the center of a visual field of the finder in the case of the photographed object located at a close distance since the optical axis of the photographing lens system 10 is different from the optical axis of the finder system. Such a shift is called parallax.

In particular, in the lens shutter camera using a zoom lens in the photographing lens system, this parallax is severely caused on a long focal length side of this camera.

Further, parallax amounts at short and long focal lengths are different from each other on a film surface. Accordingly, it is insufficient to correct parallax by using a parallax correcting method applied to a camera using a photographing lens having a single focal length.

For example, Japanese Patent Application Laying Open (KOKAI) No. 63-179340 discloses a real image type finder having a function for correcting parallax. In this real image type finder a portion of a Porro prism is constructed by a reflecting mirror and this reflecting mirror is rotated in accordance with distance information about an object so as to correct parallax. In such a method for rotating the reflecting mirror, no optical axis of the finder is perpendicular to an image plane by the rotation of the reflecting mirror, thereby reducing an image performance.

Figure 3A:
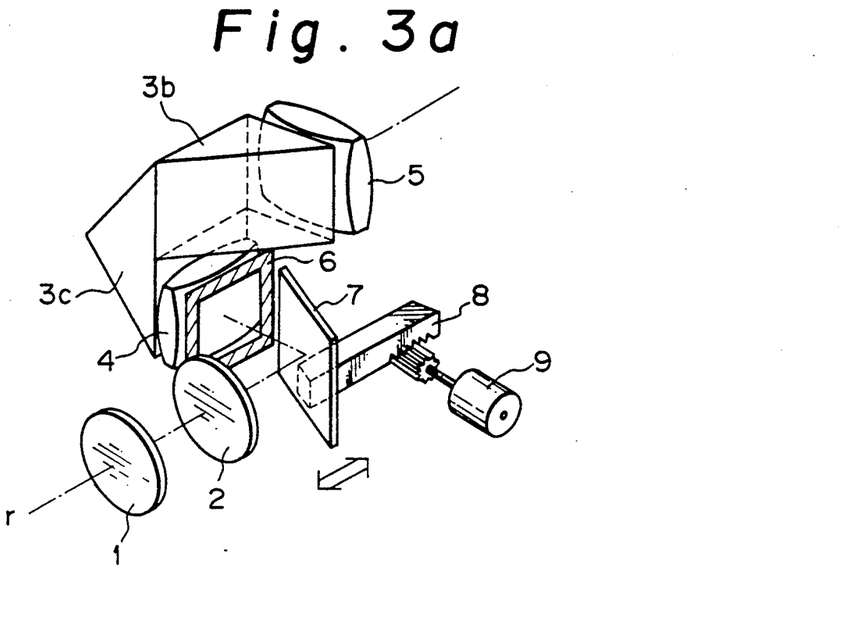
FIG. 3a is a perspective view showing the schematic construction of a real image type zoom finder having first and second structures in accordance with a first embodiment of the present invention.
Figure 3B:
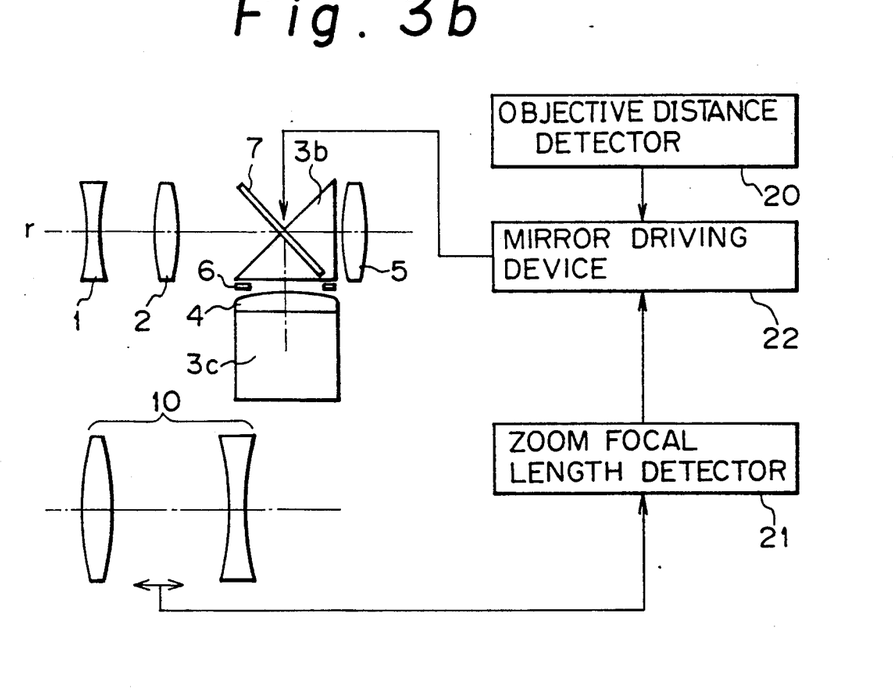
FIG. 3b is an explanatory block view showing the schematic constructions of an optical system and a photographing lens system in the real image type zoom finder having the first and second structures in accordance with the first embodiment of the present invention and simultaneously showing flow of information in the real image type zoom finder.

FIGS. 3a and 3b are views showing a real image type zoom finder having first and second structures in accordance with a first embodiment of the present invention. FIG. 3a is a perspective view showing a schematic construction of the real image type zoom finder. FIG. 3b is an explanatory view showing the schematic constructions of an optical system and a photographing lens system in the real image type zoom finder. FIG. 3b is simultaneously a block diagram showing flow of information in the real image type zoom finder.

In FIGS. 3a and 3b, the real image type zoom finder in the present invention has a first lens group 1 and a second lens group 2 constituting an objective lens system, and two prisms 3b and 3c constituting a Porro prism section 3. The real image type zoom finder further has a reflecting mirror 7, a condenser lens 4, an eyepiece system 5, a frame 6 for a visual field, and a reflecting mirror driving device 22 having a connection member 8 and a drive motor 9. An optical path of light transmitted through the first and second lens groups 1 and 2 in the objective lens system is bent by the reflecting mirror 7 of the Porro prism section 3. The bent light is then transmitted to the eyepiece system 5 through the frame 6 for a visual field, the condenser lens 4 and the prisms 3c and 3b of the Porro prism section 3.

The first and second lens groups 1 and 2 of the objective lens system are moved in a direction of an optical axis r of the objective lens system in accordance with zooming of a photographing lens system 10, thereby changing a focal length of the objective lens system. The Porro prism section 3 is an image-inverting section for changing an inverted image formed by the lens system to an erecting image. The reflecting mirror 7 constituting a portion of the Porro prism section 3 is moved by the reflecting mirror driving device 22 in the direction of the optical axis r of the objective lens system in accordance with distance information about a photographed object from an objective distance detector 20, and/or information about the focal length of a zoom lens from a zoom focal length detector 21. Parallax is corrected by this movement of the reflecting mirror 7.

Similar effects can be also obtained when the movable reflecting mirror 7 is moved in the direction of an optical axis after the optical path of light is reflected by the mirror 7.

Figures 4A, 4B:
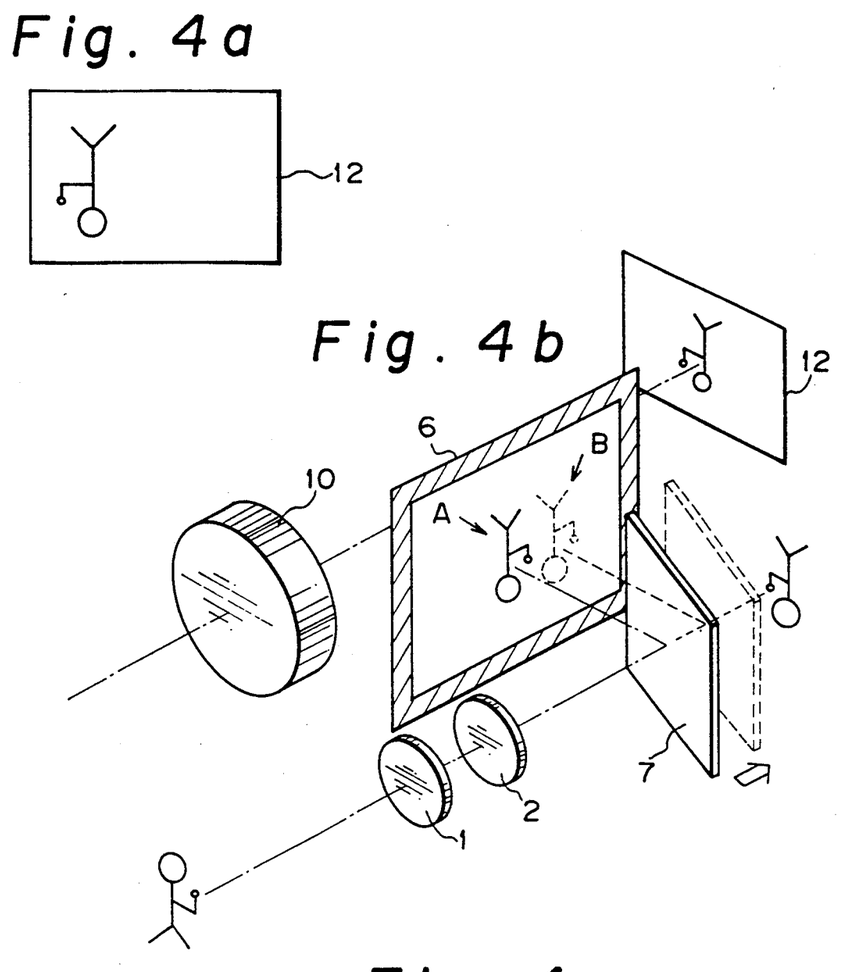
FIGS. 4a to 4c are views for explaining an operation and effects of the real image type zoom finder having the first and second structures of the present invention.

An operation and effects of the real image type zoom finder having the first and second structures shown in FIG. 3a and 3b will next be described in detail with reference to FIGS. 4a to 4c.

In the case of the general real image type zoom finder, a photographed object on the optical axis of a finder is located in the center of a visual field when a distance between the photographed object and a camera is very long. Further, a photographed image is located in the center of a film surface 12. In contrast to this, when the distance between the photographed object and the camera is short, the photographed image is shifted from the center of the film surface 12 as shown in FIG. 4a although an image of the finder is located in the center thereof.

Therefore, in the real image type zoom finder of the present invention, a portion of the Porro prism of the finder is constructed by the reflecting mirror 7. As shown in FIG. 4b, this reflecting mirror 7 is moved in the direction of the optical axis of the objective lens system in accordance with distance information about the photographed object from the objective distance detector 20. Namely, the reflecting mirror 7 within the finder is moved in the direction of this optical axis so that an image within the frame 6 for a visual field is moved from position A to position B in FIG. 4b. Accordingly, the same image of the photographed object as a picture actually photographed can be seen as an image of the finder, thereby correcting parallax.

When the distance between the photographed object and the camera is changed from a far distance to a close distance and the reflecting mirror 7 is moved, the length of an optical path from the first and second lens groups 1 and 2 of the objective lens system in the finder to the frame 6 for a visual field is changed in a direction in which this length is increased. As shown in FIG. 4c, the position of an image is really shifted backward with respect to the photographed object located at a close distance. For example, the position of an image of the photographed object at a close distance is shifted backward by distance $\Delta$ from the position of an image of the photographed object located at infinity. Accordingly, the increasing of the length of the above optical path has such a secondary effect that a movement of an image of the finder is decrease even if the object gets near.

Figure 5A:
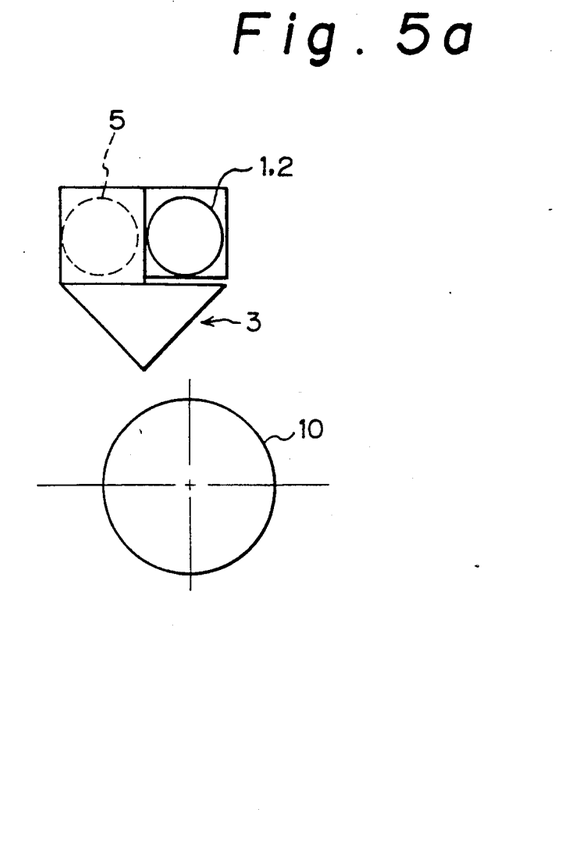
FIG. 5a is a front view of a real image type zoom finder having third and fourth structures in accordance with a second embodiment of the present invention and shows an arrangement example in which a photographing lens system and a real image type zoom finder system are seen from the front side of a camera.
Figure 5B:
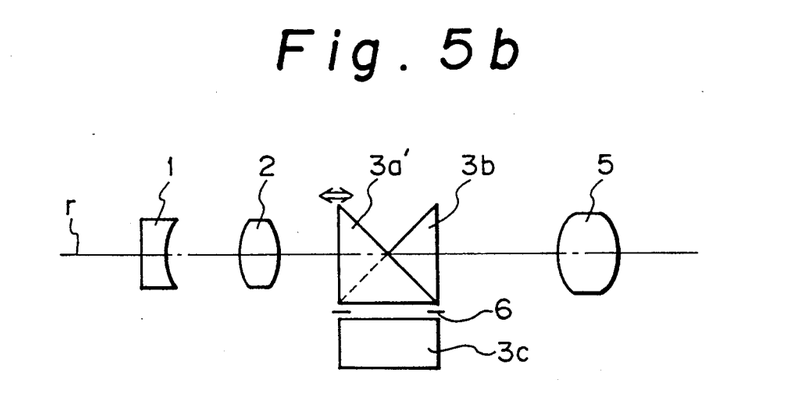
FIG. 5b is an explanatory view of the real image type zoom finder having the third and fourth structures in the second embodiment of the present invention and shows an optical system of the real image type zoom finder system.
Figure 6:
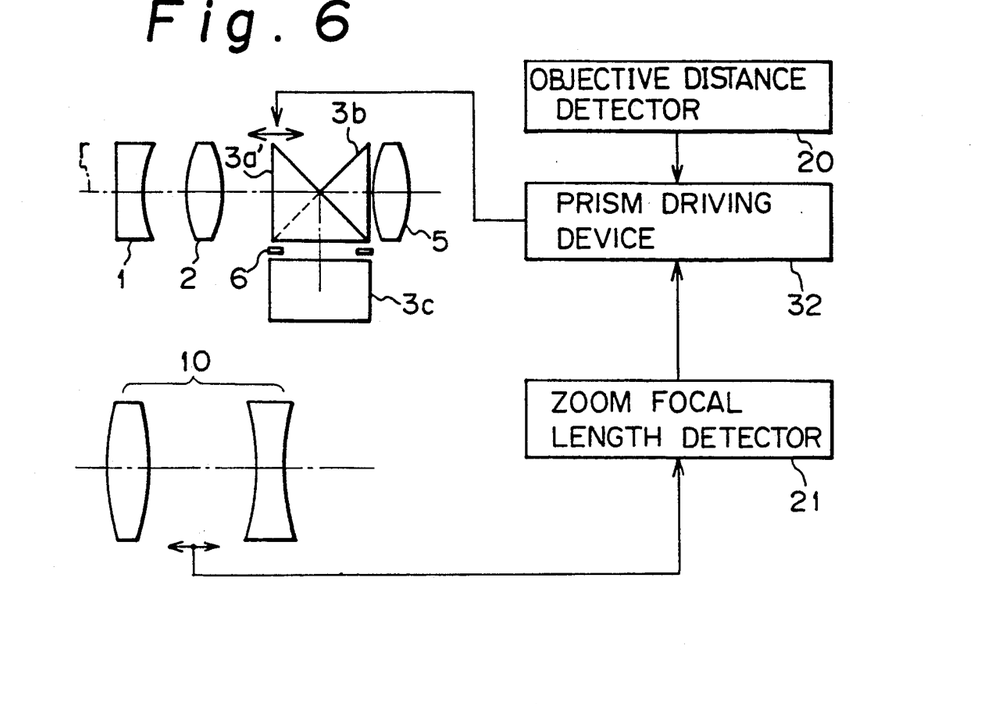
FIG. 6 is an explanatory view for showing schematic constructions of the optical system and the photographing lens system of the real image type zoom finder having the third and fourth structures and is simultaneously a block diagram showing flow of information in the real image type zoom finder.
Figure 7A:
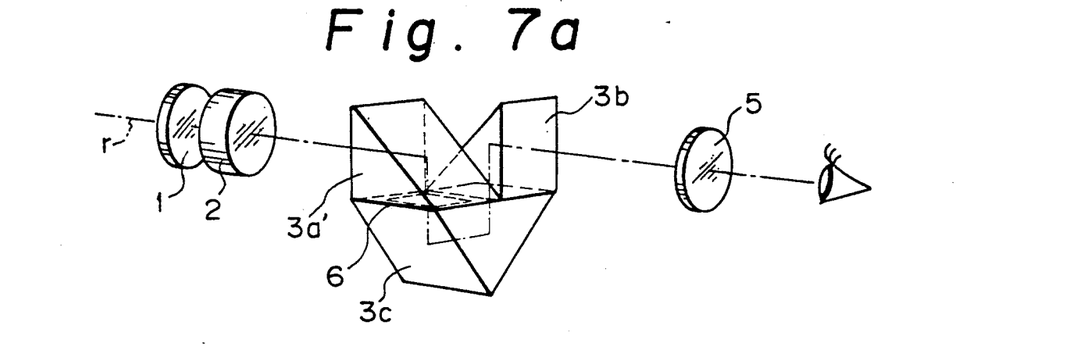
FIG. 7a is an explanatory perspective view of the real image type zoom finder having the third and fourth structures of the present invention and shows an operating state of a movable prism constituting a portion of a Porro prism section in the real image type zoom finder system before this movable prism is moved.
Figure 7B:
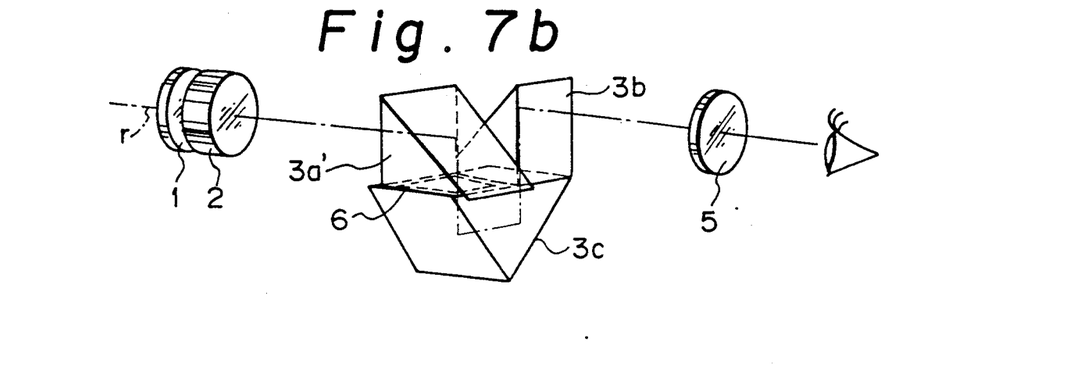
FIG. 7b is an explanatory perspective view of the real image type zoom finder having the third and fourth structures of the present invention and shows an operating state of the movable prism constituting a portion of the Porro prism section in the real image type zoom finder system when this movable prism is moved.

FIGS. 5 to 7 are views of a real image type zoom finder having third and fourth structures in accordance with a second embodiment of the present invention.

FIG. 5a is a front view of the real image type zoom finder showing an arrangement example in which a photographing lens system 10 and a real image type zoom finder system are seen from the front side of a camera. In this arrangement example, the real image type zoom finder system is located above the photographing lens system 10. FIG. 5b is a view for explaining an optical system of the real image type zoom finder system. FIG. 6 is an explanatory view for showing schematic constructions of the optical system and a photographing lens system of the real image type zoom finder. FIG. 6 is simultaneously a block diagram showing flow of information in this real image type zoom finder. FIGS. 7a and 7b are perspective views showing moving states of a movable prism constituting a portion of a Porro prism section in the real image type zoom finder system. FIG. 7a is a view showing an operating state of the movable prism before the movable prism is moved. FIG. 7b is a view showing an operating state of the movable prism when the movable prism is moved.

This real image type zoom finder has a first lens group 1 and a second lens group 2 constituting an objective lens system, and three prisms 3a', 3b, 3c constituting a Porro prism section 3. The real image type zoom finder further has an eyepiece system 5 and a frame 6 for a visual field. An optical path of light transmitted through the first and second lens groups 1 and 2 in the objective lens system is bent by the prism 3a' constituting a portion of the Porro Prism section 3. The bent light is then transmitted to the eyepiece system 5 through the frame 6 for a visual field and the prisms 3c and 3b of the Porro prism section 3.

The first and second lens groups 1 and 2 of the objective lens system are moved in a direction of an optical axis r of the objective lens system in accordance with zooming of a photographing lens system 10, thereby changing a focal length of the objective lens system. The Porro prism section 3 is an image-inverting section for changing an inverted image formed by the lens system to an erecting image. In this embodiment, as shown in FIGS. 7a and 7b, the prism 3a' constituting a portion of the Porro prism section 3 can be moved in the direction of the above optical axis. The prism 3a' is moved by a prism driving device 32 in the direction of the optical axis r of the objective lens system in accordance with distance information about a photographed object from an objective distance detector 20 shown in FIG. 6, and/or information about the focal length of a zoom lens from a zoom focal length detector 21. Parallax is corrected by this movement of the prism 3a'. The prism driving device 32 for moving the movable prism 3a' can be constructed by a driving device similar to the reflecting mirror driving device shown in FIG. 3a.

Figure 8A:
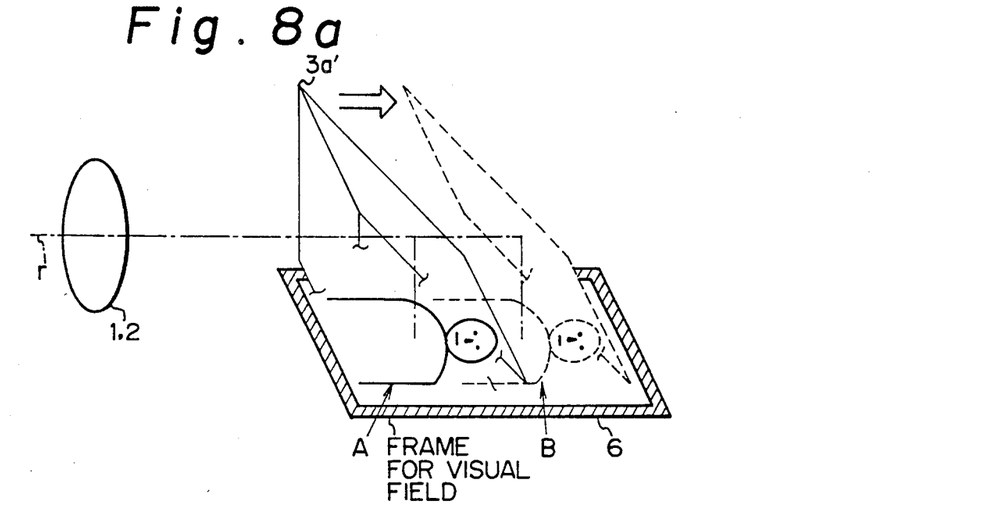
FIGS. 8a to 8c are views for explaining an operation and effects of the real image type zoom finder having the third and fourth structures of the present invention.
Figure 8B:
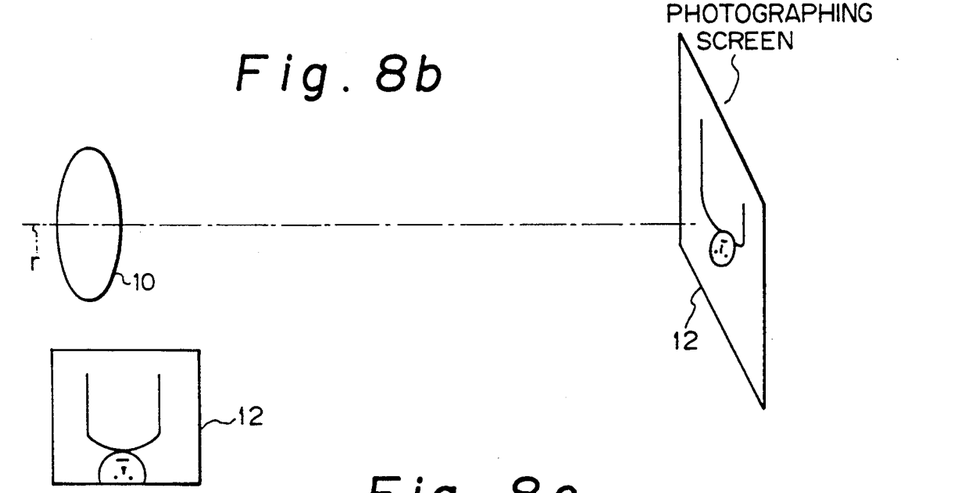

An operation and effects of the real image type zoom finder having the third and fourth structures shown in FIGS. 5 to 7 will next be described in detail with reference to FIGS. 8a to 8c.

In the case of the general real image type zoom finder, a photographed object on the optical axis of a finder is located in the center of a visual field when a distance between the photographed object and a camera is very long. Further, a photographed image is located in the center of a film surface 12. In contrast to this, when the distance between the photographed object and the camera is short, the photographed image is shifted from the center of the film surface 12 as shown in FIG. 8b although an image of the finder is located in the center thereof.

Therefore, in the real image type zoom finder of the present invention, the movable prism 3a' constituting a portion of the Porro prism section of the finder is moved in the direction (an arrow direction shown in FIG. 8a) of the optical axis of the objective lens system in accordance with distance information about the photographed object from the objective distance detector 20. Namely, the movable prism 3a' within the finder is moved in the direction of this optical axis so that an image within the frame 6 for a visual field is moved from position A to position B in FIG. 8a. Accordingly, the same image of the photographed object as a picture actually photographed can be seen as a finder image, thereby correcting parallax.

When the distance between the photographed object and the camera is changed from a far distance to a close distance and the movable prism 3a' is moved, the length of an optical path from the first and second lens groups 1 and 2 of the objective lens system in the finder to the frame 6 for a visual field is changed in a direction in which this length is increased. As shown in FIG. 8c, the position of an image is really shifted backward with respect to the photographed object located at a close distance. For example, the position of an image of the photographed object at a close distance is shifted backward by distance $\Delta$ from the position of an image of the photographed object located at infinity. Accordingly, the increasing direction of the length of the above optical path is a direction for holding a diopter of the finder so that the diopter of the finder can be held as a secondary effect.

Figure 4C:
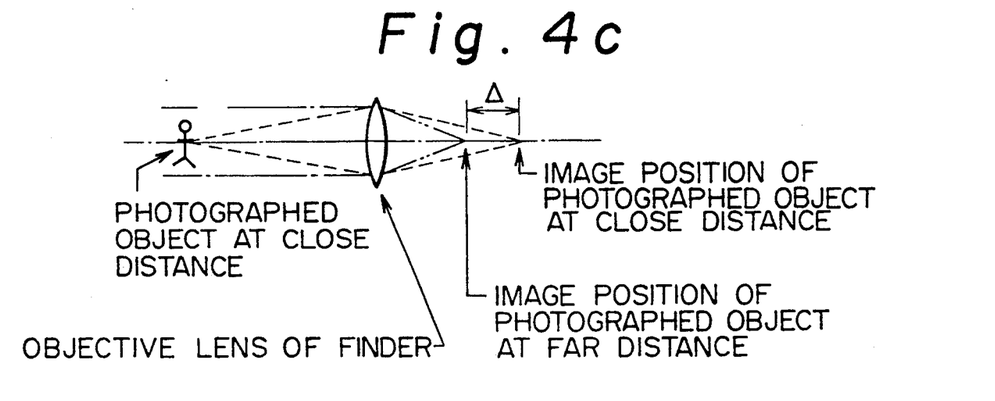
Figure 8C:
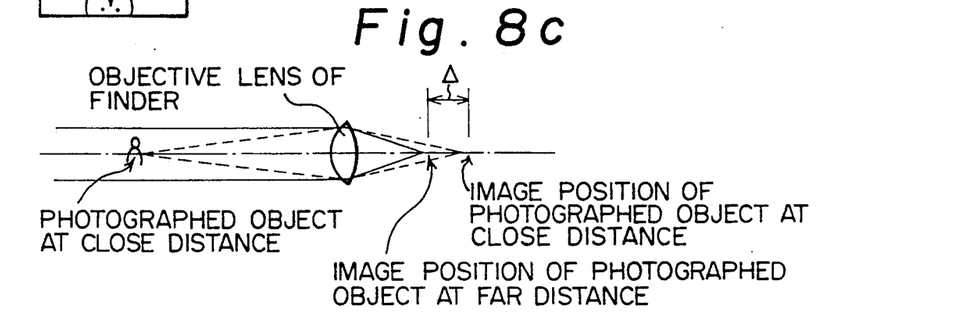

In a camera having the photographing lens composed of a zoom lens, parallax and the shift $\Delta$ in position of an image of the photographed object at a close distance in the finder objective lens system are increased on the long focal length side as shown in FIGS. 4c and 8c.

Therefore, in the second and fourth structures of the present invention, as shown in FIGS. 3b and 6, moving amounts of the reflecting mirror 7 and the movable prism 3a' are controlled in accordance with the zoom focal length information from the zoom focal length detector 21 in addition to the distance information about the photographed object from the objective distance detector 20. Thus, it is possible to simultaneously correct parallax and diopter of the finder.

A means for controlling the movable amounts of the reflecting mirror 7 and the movable prism 3a' can be constructed by a controller such as one-chip microcomputer arranged within the mirror driving device 22 shown in FIG. 3b and the prism driving device 32 shown in FIG. 6. In this case, a data table for calculating the above moving amounts according to the distance information about the photographed object and the zoom focal length information is inputted to a memory of the controller in advance. The operations of a motor 9, etc. of each of the mirror driving device 22 and the prism driving device 32 are controlled in accordance with the moving amounts calculated on the basis of this data table so that it is possible to easily and automatically control the movements of the reflecting mirror 7 and the movable prism 3a'.

As mentioned above, in the first structure of the present invention, the reflecting mirror constituting a portion of the Porro prism is moved in the direction of the above optical axis in accordance with the distance between the camera and the photographed object. Accordingly, it is possible to correct parallax in a state in which this optical axis is perpendicular to an image plane. Therefore, it is possible to prevent an image performance of the real image type zoom finder from being reduced.

In the second structure of the present invention, the reflecting mirror constituting a portion of the Porro prism is moved in the direction of the above optical axis in accordance with the distance between the camera and the photographed object and a zoom focal length of the photographing lens. Accordingly, it is possible to adjust a correction amount of parallax to a suitable amount in accordance with a change in parallax amount caused by a change in focal length of the photographing lens. Further, a diopter of the finder can be simultaneously corrected.

In the third structure of the present invention, the movable prism constituting a portion of the Porro prism is moved in the direction of the above optical axis in accordance with the distance between the camera and the photographed object. Accordingly, it is possible to correct parallax in a state in which this optical axis is perpendicular to an image face. Therefore, it is possible to prevent an image performance of the real image type zoom finder from being reduced.

In the fourth structure of the present invention, the movable prism constituting a portion of the Porro prism is moved in the direction of the above optical axis in accordance with the distance between the camera and the photographed object and a zoom focal length of the photographing lens. Accordingly, it is possible to adjust a correction amount of parallax to a suitable amount in accordance with a change in parallax amount caused by a change in focal length of the photographing lens. Further, a diopter of the finder can be simultaneously corrected.

A real image type zoom finder in accordance with a third embodiment of the present invention will next be described in detail with reference to FIGS. 9 to 12.

Figure 9:
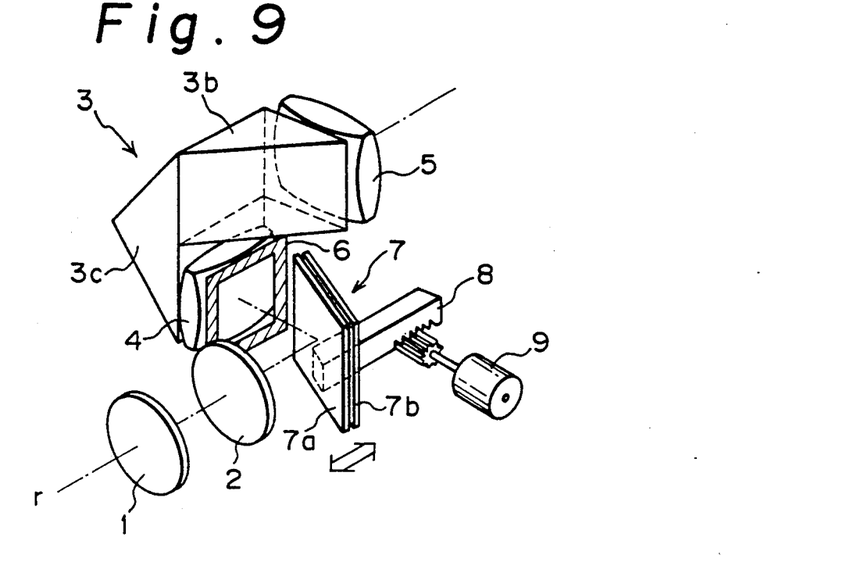
FIG. 9 is a perspective view showing the schematic construction of a real image type zoom finder in accordance with a third embodiment of the present invention.
Figure 10:
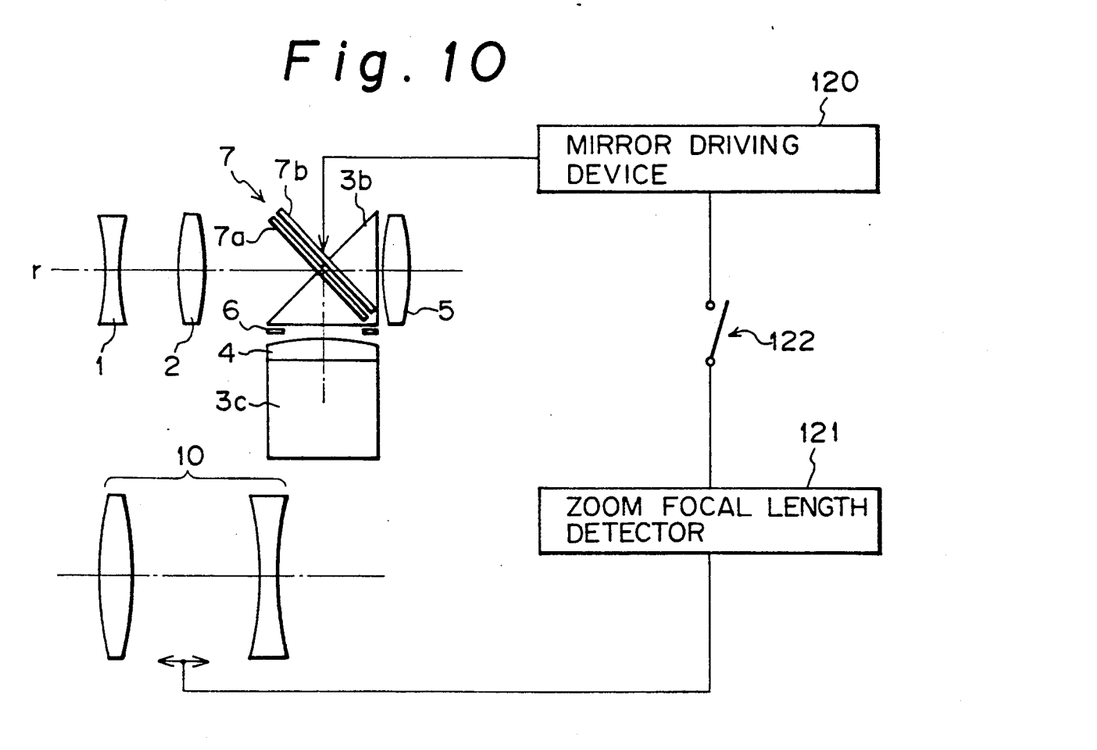
FIG. 10 is an explanatory view showing an optical system and flow of information in the real image type zoom finder shown in FIG. 9.

FIG. 9 is a perspective view showing a schematic construction of the real image type zoom finder in this embodiment. FIG. 10 is an explanatory view showing an optical system and flow of information in the real image type zoom finder in this embodiment.

In FIGS. 9 and 10, the real image type zoom finder in the third embodiment of the present invention has a first lens group 1 and a second lens group 2 constituting an objective lens system, and two prisms 3b and 3c constituting a Porro prism section 3. The real image type zoom finder further has a reflecting mirror 7 composed of two mirrors 7a and 7b, a condenser lens 4, an eyepiece system 5, a frame 6 for a visual field, and a reflecting mirror driving device 120 having a connection member 8 and a drive motor 9. An optical path of light transmitted through the first and second lens groups 1 and 2 in the objective lens system is bent by the reflecting mirror 7 composed of the two mirrors 7a and 7b. The bent light is then transmitted to the eyepiece system 5 through the frame 6 for a visual field, the condenser lens 4 and the prisms 3c and 3b.

The first and second lens groups 1 and 2 of the objective lens system are moved in a direction of an optical axis r of the objective lens system in accordance with zooming of a photographing lens system 10, thereby changing a focal length of the objective lens system.

The Porro prism section 3 is an image-inverting section for changing an inverted image formed by the lens system to an erecting image. As mentioned above, the reflecting mirror 7 constituting a portion of the Porro prism section 3 is composed of the two overlapped mirrors 7a and 7b. The first mirror 7a of the reflecting mirror 7 is located on a side of the first and second lens groups 1 and 2 in the objective lens system and is constructed by a semi-transparent mirror. The second mirror 7b of the reflecting mirror 7 is constructed by a total reflection mirror. When a para-visual mode switch 122 shown in FIG. 10 is turned on, the second mirror 7b is moved by the reflecting mirror driving device 120 in an arrow direction shown in FIG. 9 by a moving amount according to information about the focal length of a zoom lens from a zoom focal length detector 121. Namely, the second mirror 7b is moved by the above moving amount by the reflecting mirror driving device 120 in the direction of the optical axis of the first and second lens groups in the objective lens system.

Similar effects can be also obtained when the second mirror 7b is moved in the direction of an optical axis after the optical path of light is bent by the mirror 7.

Figure 11:
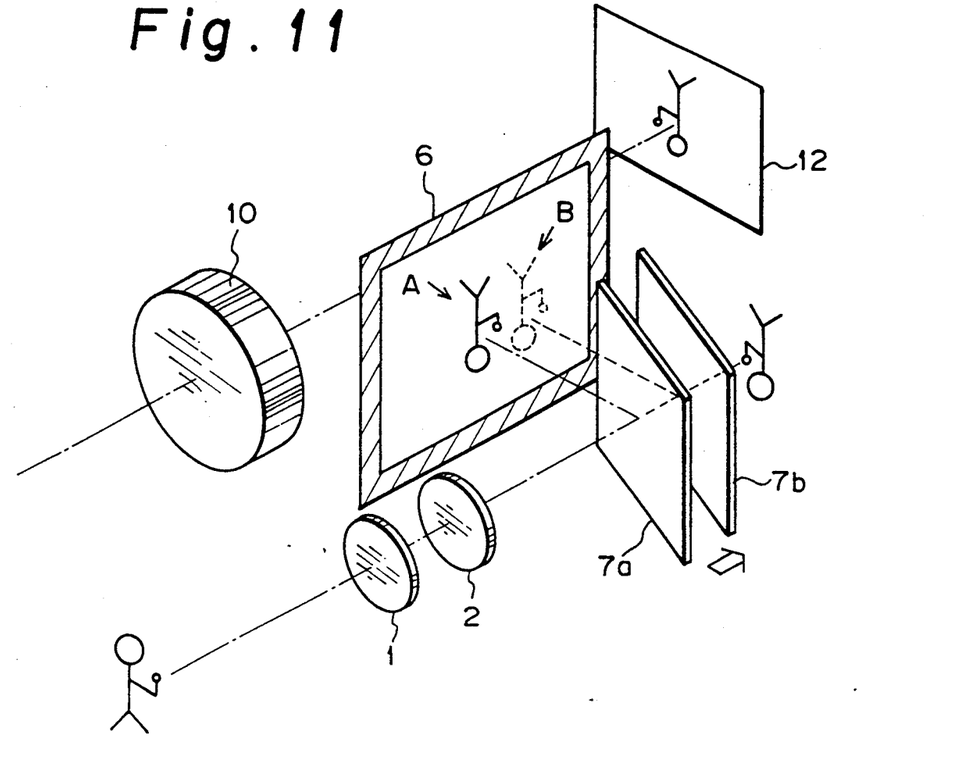
FIG. 11 is a view for explaining an operation and effects of the real image type zoom finder shown in FIGS. 9 and 10.
Figure 12A:
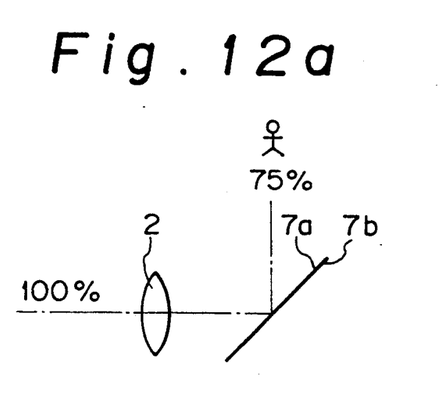
FIG. 12a is a view for explaining an operation and effects of the real image type zoom finder shown in FIGS. 9 and 10 and shows an operating state of the real image type zoom finder in which a para-visual mode switch is turned off.
Figure 12B:
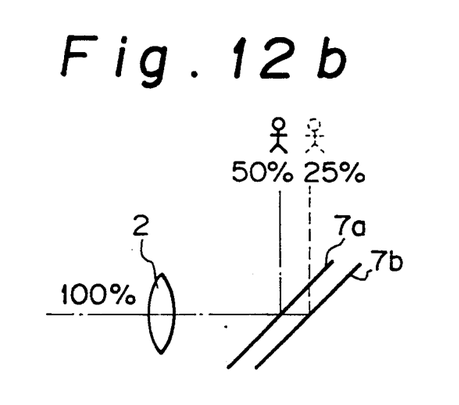

An operation and effects of the real image type zoom finder having structures shown in FIGS. 9 and 10 will next be described in detail with reference to FIGS. 11 and 12.

In the case of the general real image type zoom finder, a photographed object on the optical axis of a finder is located in the center of a visual field when a distance between the photographed object and a camera is very long. Further, a photographed image is located in the center of a film surface 12. In contrast to this, when the distance between the photographed object and the camera is short, the photographed image is shifted from the center of the film surface 12 as shown in FIG. 4a although an image of the finder is located in the center thereof.

Therefore, in the real image type zoom finder in this embodiment, the reflecting mirror 7 is constructed by the two overlapped mirrors 7a and 7b constituting a portion of the Porro prism section in the finder. When the para-visual mode switch 122 is turned on, the second mirror 7b is moved in the direction of the optical axis of the first and second lens groups 1 and 2 in the objective lens system by a distance corresponding to a parallax amount caused at a proximate distance in accordance with the focal length of a zoom lens at this time.

In such a structure, a visual field image in the frame 6 for a visual field forms into both an image A formed by the first mirror 7a and an image B formed by the second mirror 7b. The parallax amount according to the focal length of the zoom lens at this time can be easily visualized from a shift in image area between the first and second mirrors 7a and 7b. Thus, it is possible to easily and simultaneously visualize photographing ranges at infinity and a proximate distance.

When the para-visual mode switch 122 is turned on, the two overlapped images are formed as mentioned above. In this case, as shown in FIGS. 12a and 12b, there is a difference in density between the images A and B respectively formed by the first and second mirrors 7a and 7b since the first mirror 7a composed of a semi-transparent mirror has a certain transmittance. Accordingly, it is possible to easily judge whether the image A or B is formed at infinity or the proximate distance.

At this time point, no distance between the photographed object and the camera is yet adjusted on the side of a photographing lens and no distance information about the photographed object can be obtained. Accordingly, only the image areas at infinity and the proximate distance are indicated, but it is possible to determine the frame more accurately.

A means for controlling the movable amount of the second mirror 7b can be constructed by a controller such as one-chip microcomputer arranged within the mirror driving device 120 shown in FIG. 10. In this case, a data table for calculating the above moving amount in accordance with the zoom focal length information is inputted to a memory of the controller in advance. When the para-visual mode switch 122 is turned on, the operation of a motor 9 of the mirror driving device 120 is controlled in accordance with the focal length of the zoom lens and the moving amount calculated by the data table so that it is possible to easily and automatically control the movement of the second mirror 7b.

As mentioned above, in accordance with the third embodiment of the present invention, the second mirror of the reflecting mirror constituting a portion of the Porro prism section is moved in the direction of an optical axis of the objective lens system by a moving amount according to information about the focal length of a zoom lens. Accordingly, it is possible to form two overlapped images by the first and second mirrors within the visual field of a finder. The image formed by the second mirror can be set to an image shifted by a parallax amount according to the focal length of the zoom lens when the photographed object is photographed at a close distance. Accordingly, it is possible to easily visualize the parallax amount according to the focal length of the zoom lens from a shift in image area between the first and second mirrors. Thus, it is possible to easily and simultaneously visualize photographing ranges at infinity and a proximate distance so that a frame according to the focal length of the zoom lens can be easily determined.

Many widely different embodiments of the present invention may be constructed without departing from the spirit and scope of the present invention. It should be understood that the present invention is not limited to the specific embodiments described in the specification, except as defined in the appended claims.

What is claimed is:

1. A real image type zoom finder having an objective lens system and an eyepiece lens system comprising:
   prism means for changing an inverted image formed by said objective lens system to an erecting image;
   a stationary semi-transparent mirror arranged between said objective lens system and said prism means;
   a total reflection mirror overlapped with said semi-transparent mirror on an opposite side of said objective lens system; and
   a driving means for driving said total reflection mirror so as to move in a direction of an optical axis of said objective lens systems.

2. A real image type zoom finder according to claim 1, wherein said prism means comprises a Porro prism.

3. A real image type zoom finder according to claim 1, wherein said driving means drives said total reflection mirror according to a focal length of a zoom lens.

4. A ream image type zoom finder according to claim 3, wherein a parallax amount according to said focal length of said zoom lens is visualized from a shift between an image formed by said semi-transparent mirror and an image formed by said total reflection mirror.

* * * * *